United States Patent [19]

Shimizu

[11] Patent Number: 4,880,674

[45] Date of Patent: Nov. 14, 1989

[54] SYNTHETIC RESIN MOLDING FOR AUTOMOTIVE VEHICLES

[75] Inventor: Shoji Shimizu, Tokyo, Japan

[73] Assignees: Katayama Kogyo Co., Ltd., Okayama; Shoei Jushi Co., Ltd., Tokyo, both of Japan

[21] Appl. No.: 253,124

[22] Filed: Oct. 4, 1988

[30] Foreign Application Priority Data

Oct. 19, 1987 [JP] Japan .............................. 62-158700[U]
Dec. 4, 1987 [JP] Japan .............................. 62-184440[U]

[51] Int. Cl.⁴ .............................................. B60R 13/04
[52] U.S. Cl. .......................................... 428/31; 52/716;
156/244.12; 264/177.1; 264/177.2; 293/128;
428/122; 428/358
[58] Field of Search ...................... 52/716; 156/244.12;
264/177.1, 177.2; 293/128; 428/31, 122, 358

[56] References Cited

U.S. PATENT DOCUMENTS

| | | | |
|---|---|---|---|
| 4,164,485 | 8/1979 | Girgis | 428/375 X |
| 4,169,186 | 9/1979 | Tazaki et al. | 428/378 X |
| 4,239,800 | 12/1980 | Girgis | 428/374 |
| 4,260,655 | 4/1981 | Zoller | 428/31 |
| 4,291,076 | 9/1981 | Katoh | 428/31 |
| 4,313,985 | 2/1982 | Narita | 428/31 |
| 4,566,929 | 1/1986 | Waugh | 428/31 X |
| 4,636,437 | 1/1987 | Algrim et al. | 428/391 |
| 4,722,818 | 2/1988 | Zoller | 264/177.1 X |
| 4,727,096 | 2/1988 | Choudin | 523/217 |
| 4,756,948 | 7/1988 | Kuramochi et al. | 428/31 X |

Primary Examiner—Henry F. Epstein
Attorney, Agent, or Firm—Rodman & Rodman

[57] ABSTRACT

A synthetic resin molding for the use of automotive vehicles are of the type in that an elongated molding product is cut into a predetermined length and mounted to a body, a window frame, a bumper or the like of automotive vehicles. The molding is constituted as such that a plurality of core yarns of glass fiber are applied to the interior of a body of the molding in parallel relation along the longitudinal direction by continuously feeding a plurality of yarns of glass fiber into a mold in the body of the molding. Therefore, the thermal contraction can be greatly minimized.

16 Claims, 3 Drawing Sheets

SYNTHETIC RESIN MOLDING FOR AUTOMOTIVE VEHICLES

BACKGROUND OF THE INVENTION

This invention relates to a synthetic resin molding for the use of automotive vehicles, particularly of the type in that a long molding product such as a side molding, a wind molding, a bumper molding, or the like is cut in a predetermined length for use.

As is shown in FIG. 4 a synthetic resin molding for the use of automotive vehicles such as a side molding 43 which is to be mounted on a body 41 of an automotive vehicle 40, a wind molding 45 which is to be mounted on a window frame of the vehicle 40 or a bumper molding 44 which is to be mounted on a bumper 42 of the vehicle 40, is of the type in that a long synthetic resin molding product, when to be mounted, is cut in a predetermined length, Therefore, when the mounted synthetic resin material is often contracted in the longitudinal direction due to change of exteral temperature, gaps are created at the end portions of such molding. This naturally badly spoils the outer appearance of such automotive vehicles and thus undesirable. In addition, a peeling-off is easily taken place due to deformation of the mounting or attaching surface of the molding. Therefore, each maker requests the coefficient of contraction to be within a predetermined range at a certain temperature in view of a difference in temperature between the severe cold time in winter and the severe hot time in summer.

To this end, an elongated molding product of a synthetic resin material has been annealed at a high temperature in order to stabilize the coefficient of contraction or a sheet of metal aggregate comprising a strip-shaped piece of iron, aluminium, stainless steel or the like has been subjected to insert-molding in order to restrict the coefficient of contraction.

However, in the conventional means for annealing an elongated molding product of a synthetic resin material, the annealing must be repeated until the coefficient of contraction of the molding product is brought to be within an allowable range. Therefore, the number of manufacturing steps is necessarily large and costs are increased due to comparatively long manufacturing time. Moreover, even by this, a completely satisfactory result is unobtainable.

On the other hand, one that is obtained by insert-molding of an aggregate of iron or the like is excellent in strength at the mounting portion, in automorphic ability, in small coefficient of contraction in the longitudinal direction of its entirety, etc. However, it has the shortcomings in that the cutting is not easy, that treatment of the end portions thereof are troublesome when the aggregate is an iron plate or the like because the end portions easily rust, and that the costs are increased in case the aggregate is aluminium or stainless steel.

SUMMARY OF THE INVENTION

The inventor of this invention has carried out several tests by applying various fiber core materials to the interior of a synthetic resin molding for the use of automotive vehicles. As a result, he has found out that if a plurality of core materials of glass fiber are arranged in good balance along the longitudinal direction within a molding by continuously feeding a plurality of yarns of glass fiber into a mold, the thermal contraction is not taken place at all or, if taken place, extremely small.

It is therefore an object of this invention to provide a synthetic resin molding for the use of automotive vehicles in which the above mentioned conventional shortcomings can be overcome, which is easy to manufacture and in which the contraction in the longitudinal direction due to changes of temperature can be minimized and in addition, a cost-down can be attained.

A synthetic resin molding for the use of automotive vehicles according to this invention is characterized in that, in a synthetic resin molding in which an elongated molding product is cut into a predetermined length and mounted to a body, a window frame, a bumper or the like of automotive vehicles, a plurality of core yarns of glass fiber are applied to the interior of a body of the molding in parallel relation along the longitudinal direction by continuously feeding a plurality of yarns of glass fiber into a mold when the body of the molding is extruded with a synthetic resin.

When a molding for the use of automotive vehicles is subjected to extrusion-molding with a synthetic resin material, a plurality of yarns of glass fiber are inserted into a mold portion at predetermiend spaces by suitable means and the yarns of glass fiber are continuously fed therein in synchronism with the molding speed. By this, a plurality of core yarns of glass fiber are disposed in parallel relation within a body portion of the molding along the longitudinal direction thereof.

The yarns of glass fiber may be twisting or non-twisting. The number of the yarns of glass fiber, the space between the adjacent yarns, etc. may be suitably established depending on the molding member because the sectional configuration, etc. of the molding member is different for each maker of automotive vehicles. In this way, we prepared a specimen of a molding in which a plurality of core yarns of glass fiber are disposed in parallel relation within a molding member. Then we cut the specimen into a predetermined length and measured the coefficient of thermal contraction in the longitudinal direction. As apparatus from the testing data which will be described, the thermal contraction was not found at all even at high temperature condition which each maker of automotive vehicles required, and an excellent effect for preventing the thermal contraction was obtained.

Since it is considered that this effect is obtained by the increased binding ability between the thermally stable yarns of glass fiber and the synthetic resin, the thermal contraction is presumably very small even in the molding members for the use of various kinds of automotive vehicles which have a little more complicated configuration in section than that of the specimen.

In a molding member for the use of automotive vehicles having the above mentioned constitution, the repetition of annealing work is not required at high temperature. Thus, a large cost-down can be attained. Moreover, the construction is simple and the molding member can be easily cut into a predetermined length. In addition, the portion where the core yarns of glass fiber are applied does not become particularly thick.

BRIEF DESCRIPTION OF THE DRAWINGS

The accompanying drawings illustrate several embodiments of a synthetic resin molding for the use of automotive vehicles according to this invention, wherein.

DETAILED DESCRIPTION OF THE PREFERRED EMBODIMENTS

The preferred embodiments of a molding for the use of automotive vehicles such as automoblies will be described with reference to FIGS. 1 through 3. In the figures, 1 denotes a whole side molding, 2 denotes a whole bumper molding and 3 denotes a whole wind molding. They are different in sectional configuration depending on the kind of automobiles on which they are mounted, makers of automobiles, mounting modes, etc.

Figures 1A, 1B, 1C:
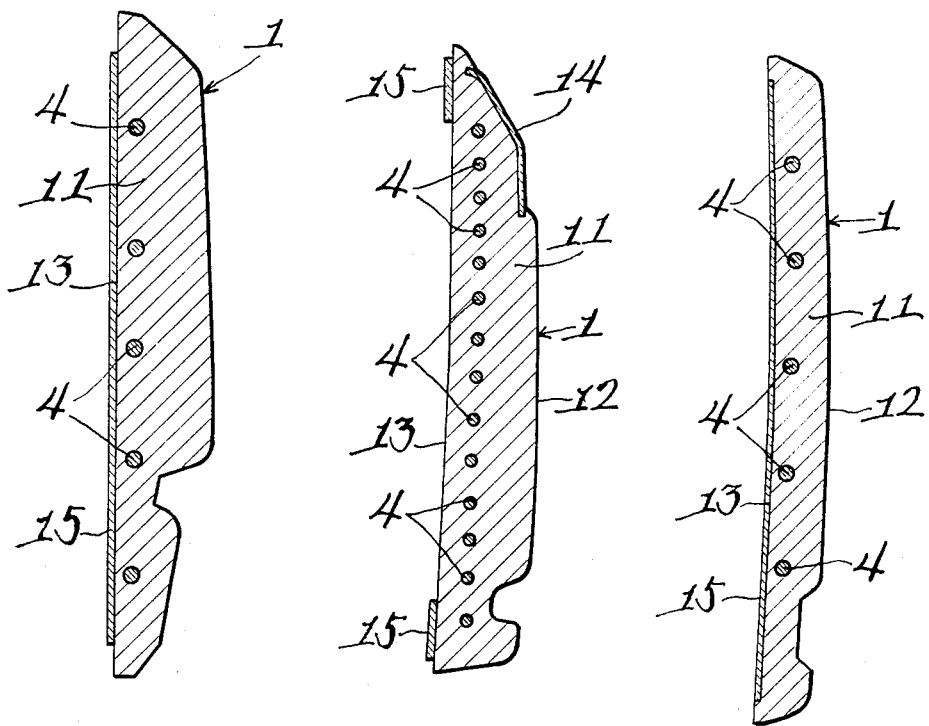
FIGS. 1(A), 1(B) and 1(C) are sectional views of various kinds of side moldings each having a different configuration in section.

The side molding 1 shown in FIG. 1 has a molding body portion 11 which is molded of a semi-rigid or flexible synthetic resin material. The side molding 1 may be provided with a bright film 14 of metal, etc. applied to its outer surface 12 by insert-molding. When such molding body portion 11 is molded, a plurality of yarns of glass fiber, i.e., five yarns in the embodiments of FIGS. 1(A) and 1(C) and a large number of yarns in the embodiment of FIG. 1(B), are inserted into a mold portion by suitable means and continuously fed therein in synchronism with the speed of extrusion.

By this, five core yarns 4 of glass fiber or a large number of core yarns 4 of glass fiber are disposed within the molding body portion 11 of the molded side molding 1 in parallel relation and in good balance along the longitudinal direction. The inserting yarns of glass fiber may be twisting or non-twisting. Also, the number of the inserting yarns, spaces between the adjacent yarns, etc. should be decided depending on a side molding to be molded. The yarns may be inserted by any suitable means. For example, yarns which have been subjected to automorphic treatment with a binder based resin may be inserted or a large number of yarns with a binder based resin prebacked may be inserted. If such means is employed, the effect of thermal contraction can be much more increased because the binding ability between the yarns of glass fiber and yarn processing resin, and the molding resin.

The core yarns 4 are preferably disposed at the center of the molding body portion 11 or at a place nearer to a back surface 13 to be mounted on an automobile body 41. Depending on a mounting mode with respect to the automobile body 41, a pressure sensitive adhesive double coated tape 15 is attached to a back surface 13 side at one stage of the following steps.

Figure 2A:
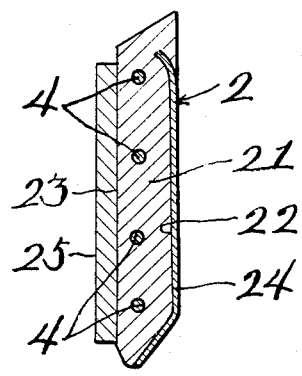
FIGS. 2(A), 2(B) and 2(C) are sectional views of various kinds of bumper moldings each having a different configuration in section.
Figure 2B:
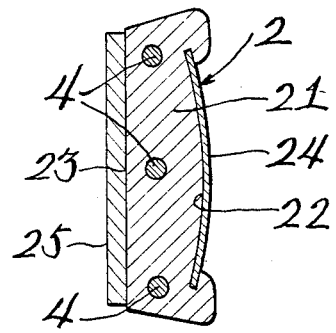
Figure 2C:
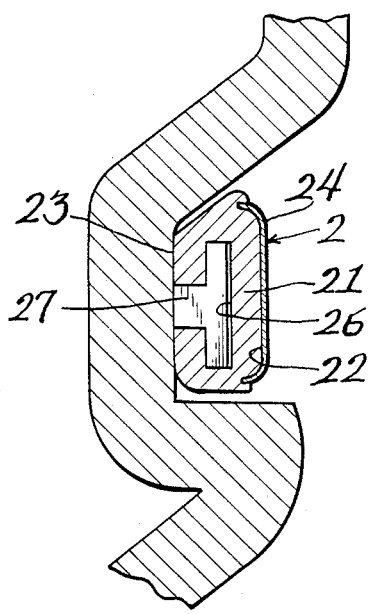

A bumper molding 2 shown in FIG. 2 is basically the same as the side molding of FIG. 1, and a bright film 24 can be applied to the outer surface 22 side of the molding body portion 21. Depending on the mounting mode with respect to a bumper 42, a pressure sensitive adhesive double coated tape 25 as shown in FIGS. 2(A) and 2(B) may be attached to the back surface 23 side, or an engaging recess 26 for allowing a mounting metal piece 27 as shown in FIG. 2(C) to engage therein may be formed, for example.

In view of the width of the molding, the sufficient number of the core yarns 4 which are to be disposed to the interior of the molding body portion 21 is three or four as shown in the illustrated embodiments.

A wind molding 3 as shown in FIG. 3 is also basically the same to the side molding of FIG. 1 and is subjectd to extrusion-molding with a semi-rigid or a flexible synthetic resin. A molding body portion 31 having an arcuate outer surface 32 includes a mounting inserting portion 33 vertically extending from the outer surface 32 and an engaging piece 35 projecting upwardly at angle so as to engage with an inner portion of a window frame and a wind glass. As is shown in FIG. 3(A), a bright film 34 may be applied to the arcuate outer surface 32 side by insert-molding.

Figure 3D:
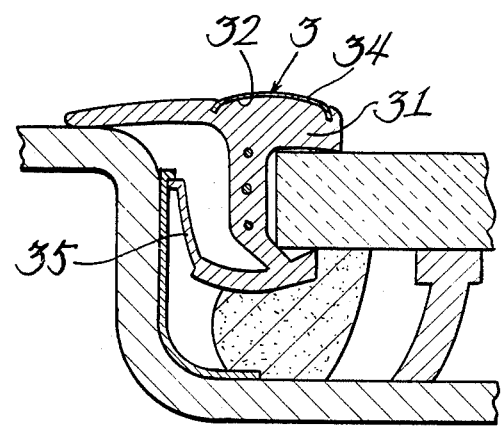
FIG. 3(D) is a sectional view showing the condition in which a wind molding is mounted on a window frame.
Figure 4:
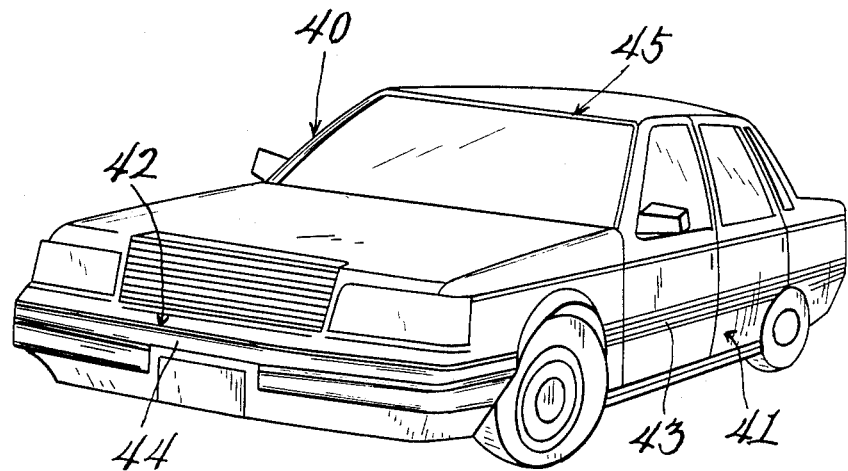
FIG. 4 is a perspective of an automobile, particularly of a portion where a side molding, a bumper molding and a wind moldings are mounted.
Figure 3A:
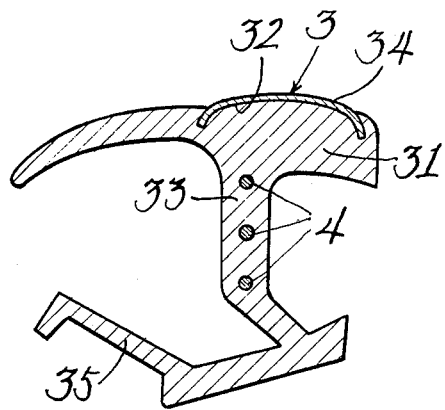
FIGS. 3(A), 3(B) and 3(C) are sectional views of various kinds of wind moldings each having a different configuration in section
Figure 3B:
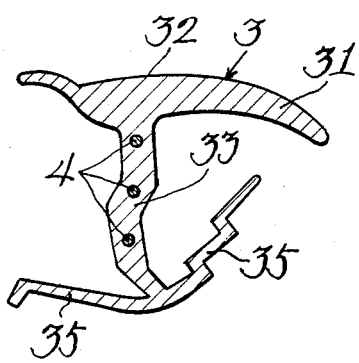
Figure 3C:
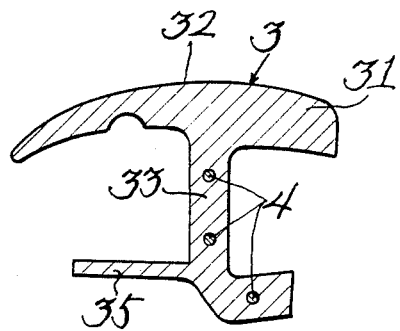

The sufficient number of the core yarns 4 of glass fiber which are to be disposed to the interior of the molding body portion 31 is about three as shown in FIGS. 3(A), 3(B) and 3(C). FIG. 3(D) illustrates the wind molding of FIG. 3(A) mounted or attached to a window frame of a front wind of an automobile.

The coefficient of thermal contraction of the side molding 1 as shown in FIG. 1(A) and that of the conventional molding which is the same in size and sectional configuration to the side molding 1 but without the core yarns 4 of glass fiber were measured and compared. The results are shown in a table listed hereunder. The side molding of FIG. 1(A) is 55 mm in width and 8 mm in thickness at its thickest portion. The annealing conditions were 1.5 hours at the temperature of 100° C. and the heating test was carried out for 5 hours at 100° C.. The changes of length were measured before and after the heating. The moldings were taken out of a furnace after a predetermined time had lapsed and left as they were until they were cooled to a normal temperature.

In the under-listed table, No. in the left column shows the sample numbers. Four different kinds of samples were prepared. Likewide, L1 shows the lengths before the heating and L2 shows the lengths after the heating. The contracting rate is L1−L2.

$$\text{Contracting rate (\%)} = \frac{L1 - L2}{L1} \times 100$$

| Comparison Table of Coefficient of Thermal Contraction | | | | |
| --- | --- | --- | --- | --- |
| No. | | L1 (mm) | L2 (mm) | R (mm) | % |
| Core- | 1 | 805 | 799 | 6 | 0.74 |
| less | 2 | 804 | 800 | 4 | 0.49 |
|  | 3 | 801 | 797 | 4 | 0.50 |
|  | 4 | 806 | 802 | 4 | 0.49 |
| Glass | 1 | 1030 | 1030 | 0 | 0 |
| w/core | 2 | 1019 | 1019 | 0 | 0 |
|  | 3 | 1040 | 1040 | 0 | 0 |
|  | 4 | 1035 | 1035 | 0 | 0 |

As apparent from the results of the above comparison measurement, it is recognized in a side molding according to this invention that the thermal contraction is not taken place at all and very stable. Therefore, it is easily understood that the thermal contraction is not taken place in a bumper molding and window molding are small both in width and thickness than this side molding.

According to a molding member for the use of automotive vehicles of this invention, since a plurality of core yarns of glass fiber are disposed in the interior of a molding body portion in parallel relation along the longitudinal direction, the thermal contraction can be completely eliminated or can be minimized as known from the comparison testing data. Therefore, the repetition of annealing work is not required at high temperature. Thus, a large cost-down can be attained. Moreover, the construction is simple and the cutting of a molding into a predetermined length is easy. In addition, the molding does not become particularly thick at a portion where core yarns of glass fiber are disposed. Thus, this invention is most suitable as a side molding, a bumper molding, or a wind molding.

What is claimed is:

1. A generally elongated synthetic resin molding having a predetermiend length that is mounted on the body, window frame or bumper of an automotive vehicle, said synthetic resin molding comprising:
    (a) a body of molding formed by extruding a synthetic resin, and
    (b) a plurality of core yarns of glass fiber embedded within said molding, wherein said glass fiber yarns embedded within said molding are disposed in parallel relation to each other along the longitudinal direction of said molding.

2. The generally elongated synthetic resin molding of claim 1, wherein said glass fiber yarns are introduced continuously into a mold while said molding is being formed by extruding the synthetic resin.

3. The generally elongated synthetic resin molding of claim 1, wherein said glass fiber yarns comprise a twisted or non-twisted variety.

4. The generally elongated synthetic resin molding of claim 1, wherein said glass fiber yarns have been treated with a binder-based resin.

5. The generally elongated synthetic resin molding of claim 1, provided with a bright film contacted to an outer surface thereof.

6. The generally elongated synthetic resin molding of claim 1, including a rear surface with mounting means.

7. The generally elongated synthetic resin molding of claim 2, wherein said glass fiber yarns comprises a twisted or non-twisted variety.

8. The generally elongated synthetic resin molding of claim 12, wherein said glass fiber yarns have been treated with a binder-based resin.

9. The generally elongated synthetic resin molding of claim 2, provided with a bright film contacted to an outer surface thereof.

10. The generally elongated synthetic resin molding of claim 2, including a rear surface with mounting means.

11. A method for reducing thermal contraction in elongated synthetic resin moldings having a predetermined length, wherein said moldings are mounted on the body, window frame, or bumper of an automotive vehicle, comprising:
    (a) forming a molding by extruding a synthetic resin; and
    (b) embedding within said molding a plurality of core yarns of glass fiber and disposing said glass fiber yarns in parallel relation to each other along the longitudinal direction of said molding.

12. The method of claim 11 wherein said glass fiber yarns are introduced continuously into a mold while said molding is being formed by extruding the synthetic resin.

13. The method of claim 11 wherein said glass fiber yarns comprises a twisted or non-twisted variety.

14. The method of claim 11 wherein said glass fiber yarns have been treated with a binder-based resin.

15. The method of claim 11 wherein said molding is provided with a bright film contacted to an outer surface thereof.

16. The method of claim 11 wherein said molding includes a rear surface with mounting means.

* * * * *

UNITED STATES PATENT AND TRADEMARK OFFICE
CERTIFICATE OF CORRECTION

PATENT NO.  : 4,880,674

DATED       : November 14, 1989

INVENTOR(S) : Shoji Shimizu

It is certified that error appears in the above-identified patent and that said Letters Patent is hereby corrected as shown below:

At column 1, line 20, change "," to --.--.

At column 4, line 8, change "subjectd" to --subjected--.

In claim 8, line 2, change "12" to --2--.

Signed and Sealed this

Ninth Day of October, 1990

*Attest:*

HARRY F. MANBECK, JR.

*Attesting Officer*  *Commissioner of Patents and Trademarks*